Jan. 2, 1951 W. A. STEPHENSON 2,536,581
HEATING OR DRYING STOVE OR CABINET
Filed Aug. 24, 1949

W. A. Stephenson
*Inventor*

Jan. 2, 1951 W. A. STEPHENSON 2,536,581
HEATING OR DRYING STOVE OR CABINET
Filed Aug. 24, 1949 3 Sheets-Sheet 3

W. A. Stephenson
*Inventor*

By
*Attorneys.*

Patented Jan. 2, 1951

2,536,581

UNITED STATES PATENT OFFICE 2,536,581

HEATING OR DRYING STOVE OR CABINET

William Anthony Stephenson, Bordesley Green, Birmingham, England, assignor to Birmingham and Blackburn Construction Company Limited, Birmingham, England Application August 24, 1949, Serial No. 112,078
In Great Britain February 15, 1949

1 Claim. (Cl. 34—224)

This invention relates to heating or drying stoves or cabinets, and it has for its object to provide for a uniform heating throughout the space of the drying chamber by the circulation of hot air.

According to the present invention, conduits pass through the drying chamber and the hot air is circulated through the conduits and passed through perforations or openings therein into the interior of the drying chamber, the hot air preferably circulating downwardly through the lower portion or bottom of the chamber. The conduits conveniently form supports for trays on which the material to be dried is placed.

Referring to the drawings—

Figure 1:
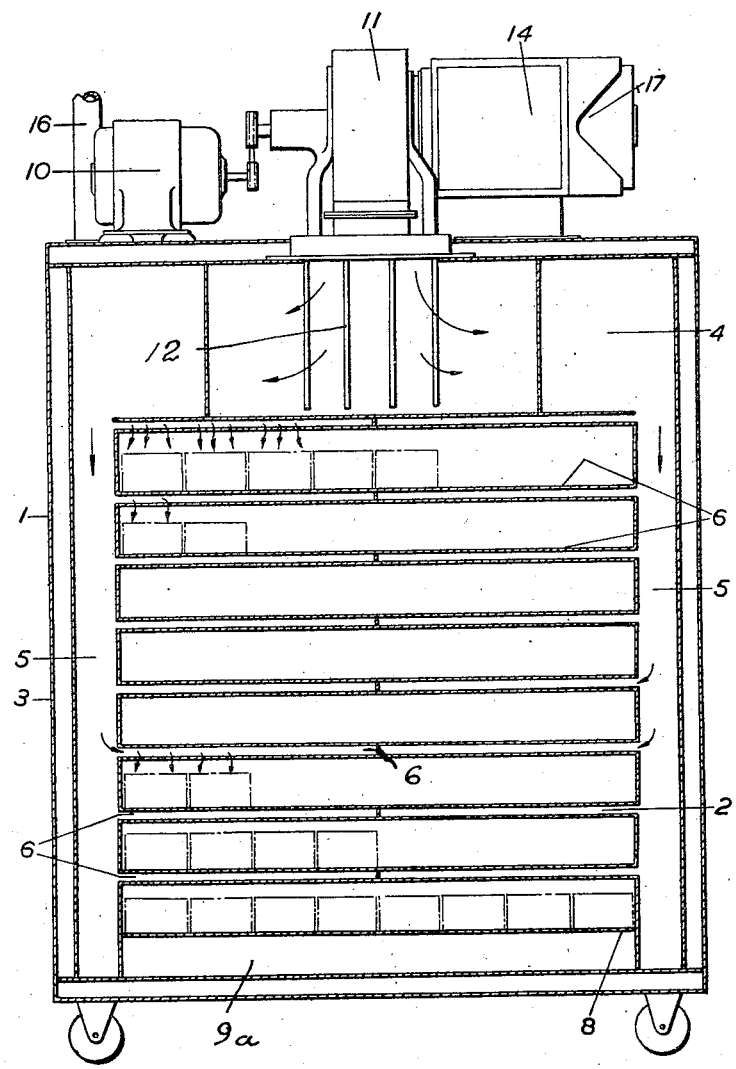
Figure 1 is a part sectional elevation of a stove constructed according to this invention, the section being taken on line I—I of Figure 2.
Figure 2:
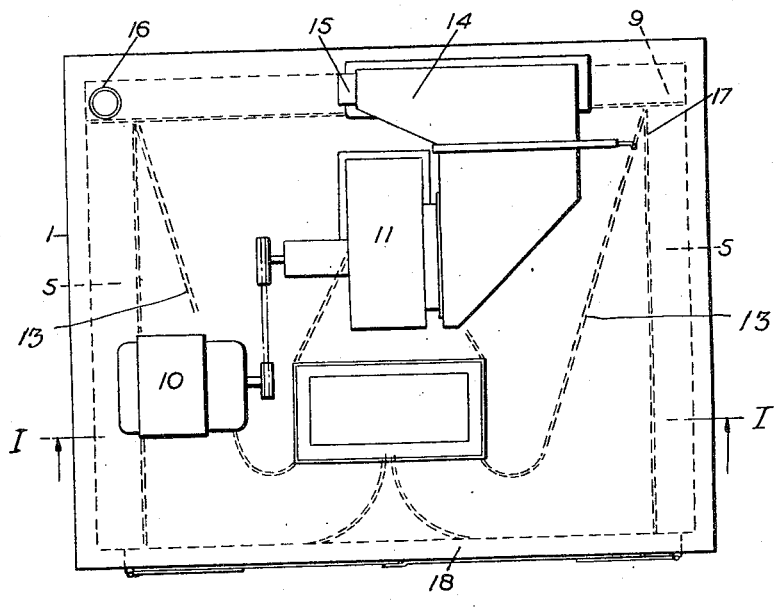
Figure 2 is a plan.
Figures 3, 4:
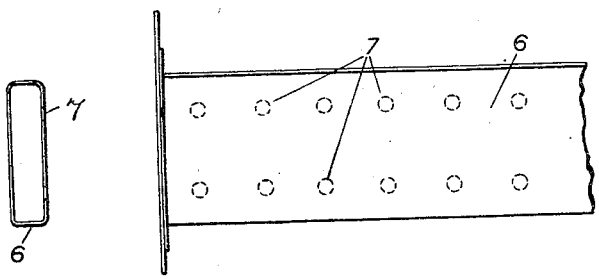
Figure 3 is a plan of a portion of a tubular horizontal support.
Figure 4 is a section of the tubular support.
Figure 5:
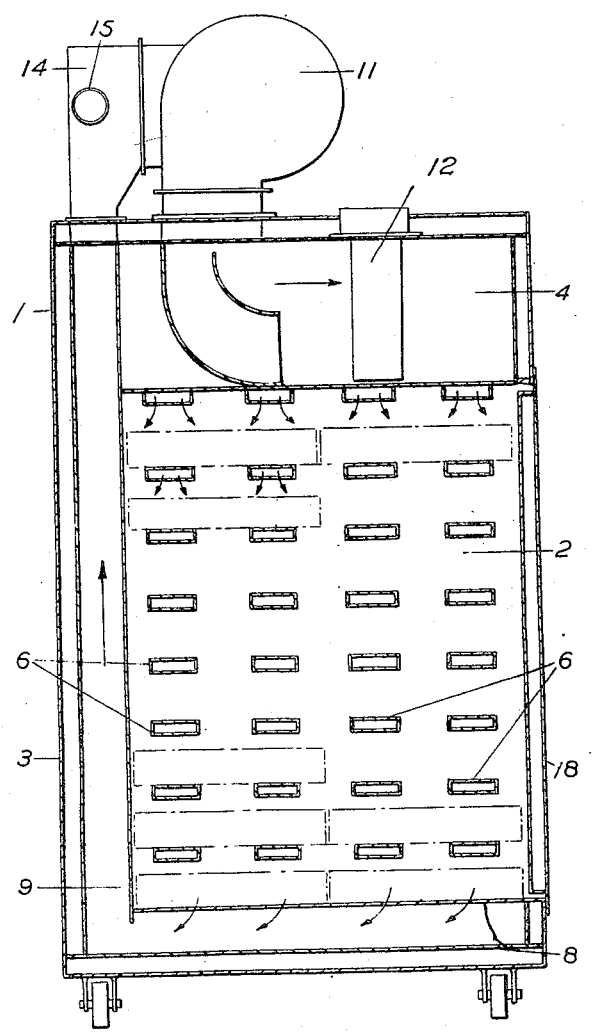
Figure 5 is a transverse sectional elevation.

According to a convenient embodiment of this invention, the drying or heating stove or chamber comprises a cabinet 1 having an inner drying compartment 2 spaced from the sides, back, bottom and top, of an outer casing 3 of the cabinet. The hot air enters in the space 4 above the top wall of the inner compartment and flows down the space 5 each side of the inner compartment. A series of tubes 6 pass transversely from side to side across the inner compartment and open into the air ducts 5 on each side of such inner compartment 2, and these tubes have perforations 7 on the underside. Conveniently four sets of tubes 6 form a horizontal tray support and any number of tray supports are provided from top to bottom of such inner compartment 2. The bottom 8 of the inner compartment is perforated and the air is exhausted through the bottom 9a at the bottom and the space 9 and out through the space 9 at the back of the inner compartment, the spaces 9a and 9 forming a return air conduit. An electric motor 10 drives the fan 11 mounted on the top of the cabinet and the air is blown through an electric heater 12 mounted in the space 4 at the top of the inner compartment. Deflector plates 13 form ducts for directing the air from the heater to the side ducts 5. Hot air is thus circulated through the inner compartment and back to the fan or blower 11, or to exhaust, or fresh air only may be circulated, or fresh air may be circulated with the re-circulation of the hot air exhausted from the inner cabinet. In the example illustrated, the fan 11 draws air from the space 9 by way of the duct 14 and recirculates the air through the cabinet. The duct 14 has a fresh air inlet 15 so that fresh air is also drawn in by the fan to be circulated with the recirculated air. An exhaust pipe 16 passes from the space 9 to permit air which is circulated through the cabinet to be exhausted by an amount corresponding to the fresh air drawn in through the inlet 15. The quantity of air delivered by the fan 11 can be regulated by the damper or valve plate 17. By this invention, therefore, hot air is admitted to the inner compartment equally throughout the interior of the inner compartment thus ensuring an even temperature throughout the space of the drying chamber, and there is hot air discharged over all the trays 19. The size of the inlet openings in the conduits may be varied to ensure an even temperature having regard to the flow of the air downwardly through the inner compartment. The outer casing and doors 18 are heat insulated.

Having thus described the invention, what is claimed as new and desired to be secured by Letters Patent is:

A drying or heating stove comprising an inner compartment forming a drying chamber and an outer casing spaced from the inner compartment at the sides to form a hot air inlet space on the outer side of each side wall of the inner compartment, a plurality of rows of spaced apart cross tubes having perforations on the underside and passing through the said side walls of said inner compartment and arranged at various heights from the bottom of said inner compartment, perforations in the bottom of the inner compartment facing the said perforations in the tubes and over substantially the full area of said bottom to form air exhaust openings, a space under the bottom and at the back of said inner compartment formed by spacing the bottom and back walls of said outer casing from the bottom and back walls of the inner compartment to form a return air conduit, a space at the top of the inner compartment communicating with said air inlet spaces at the sides of said inner compartment, a heater in the said space at the top of the inner compartment, a blower for blowing air through the heater into the said space at the top of the inner compartment and into said inner compartment through said perforated tubes and for drawing air from such inner compartment through the perforated bottom and said return air conduit to recirculate the air through the inner compartment, an extra air intake into the blower for drawing air from the atmosphere into the circulating hot air and an exhaust conduit to atmosphere communicating with the said return air conduit.

WILLIAM ANTHONY STEPHENSON.

REFERENCES CITED

The following references are of record in the file of this patent:

UNITED STATES PATENTS

| Number | Name | Date |
| --- | --- | --- |
| 1,099,546 | Garrett | June 9, 1914 |
| 1,762,910 | Chester | June 10, 1930 |